United States Patent [19]

Gerig

[11] Patent Number: 5,023,616
[45] Date of Patent: Jun. 11, 1991

[54] MICROPHONE AMPLIFIER DETECTOR

[76] Inventor: John S. Gerig, 5954 Whitehall Pl., McLean, Va. 22101

[21] Appl. No.: 665,196

[22] Filed: Aug. 25, 1967

[51] Int. Cl.$^5$ ............................................. G01S 13/74
[52] U.S. Cl. ...................................... 342/52; 367/128
[58] Field of Search .................. 343/6.5, 6.5 SS, 6.8, 343/7.6, 6, 18 D; 340/224, 410, 416; 367/128; 342/20, 52; 455/9, 20, 67, 226

[56] References Cited

U.S. PATENT DOCUMENTS

| | | | |
|---|---|---|---|
| 2,823,365 | 2/1958 | Rines | 340/2 X |
| 2,927,321 | 3/1960 | Harris | 343/18 D |
| 3,036,295 | 5/1962 | Kleist | 343/6.5 SS X |
| 3,391,404 | 7/1968 | Vogelman | 343/6 |

FOREIGN PATENT DOCUMENTS 130490  4/1946  Australia .............................. 343/7.6

Primary Examiner—Thomas H. Tarcza
Assistant Examiner—Daniel T. Pihulic
Attorney, Agent, or Firm—John E. Benoit

[57] ABSTRACT

A device for detecting a covert transmitter having a time varying impedance therein including a radio frequency transmitter and an audio frequency transmitter which are directed so as to illuminate a target area. The audio tone drives the active elements into a non-linear mode of operation to modulate the transmitted radio frequency. The re-radiated energy is detected by a further radio frequency receiver.

8 Claims, 2 Drawing Sheets

MICROPHONE AMPLIFIER DETECTOR

This invention relates generally to the detection of transmitted radio frequency energy and more particularly to the detection of covert transmitters.

The problem of reliably detecting or nullifying audio intrusion devices has been of prime importance over the past few decades. These efforts have lead to various successful techniques for providing successful countermeasures against certain types of equipment. There are primarily two areas of effort involved in the detection of these covert devices. The first relates to the threat posed by a concealed wireless microphone, a device combining a microphone with a miniature RF transmitter.

A second category of threat is presented by the microphone-preamplifier connected by wire to a remote listening post. As of this time, the major conuter-measure known to be used against such a device has been physical inspection and control of the protected area. The limitations of this approach are obvious and its failures have on occasion received wide spread publicity.

Accordingly, it is an object of this invention to provide a device for detecting a microphone-amplifier combination which contains therein a time varying impedance.

A further object of this invention is to provide the above-identified detecting means without requirement of any physical inspection as such.

These and other objects of the present invention will become obvious from the following description when taken in conjunction with the drawings wherein.

Basically, the present invention consists of a radio frequency transmitting means for illuminating a specific area to be inspected together with an acoustic tone generating means for simultaneously illuminating the area, and a radio frequency receiving means for receiving re-radiated energy from the illuminated area. This re-radiated energy exists because of a time varying impedance within the cover listening device which is driven by the audio tone so as to modulate the originally transmitted radio frequency energy.

Figure 1:
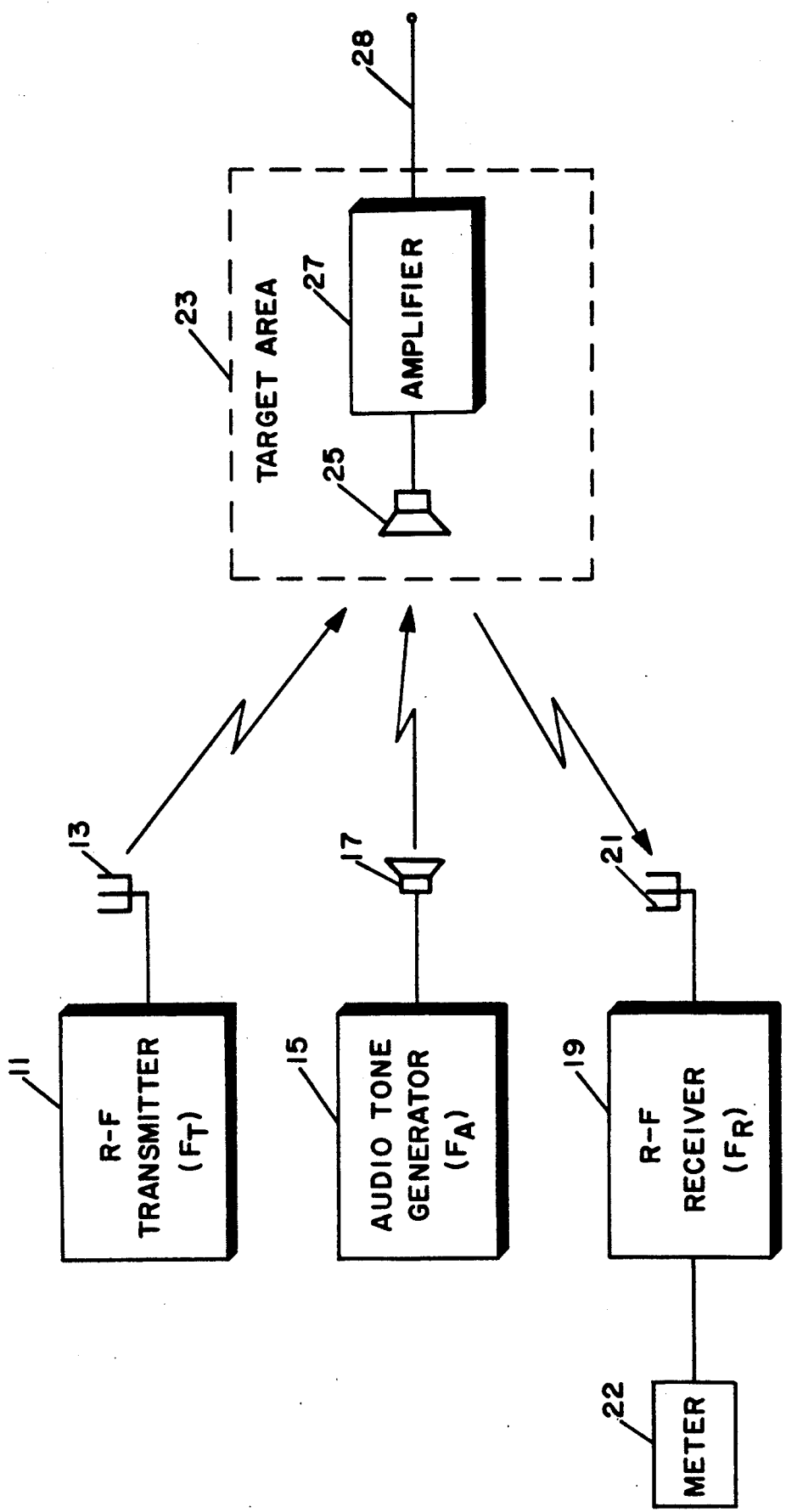
FIG. 1 is a block diagram of the basic invention.

Turning now to FIG. 1, there is shown a radio frequency transmitter 11 which transmits energy at a preselected frequency ($F_T$) by means of an antenna 13. Simultaneously, audio tone generator 15 generates a preselected audio frequency ($F_A$) which is coupled to the loudspeaker 17.

Both transmitter 11 and tone generator 15 are directed to a target area 23 to be investigated. Assuming that within target area 23 there exists a covert listening device consisting basically of a microphone 25 and an amplifier 27 coupled to a lead 28 extending to some listening post outside of the area, the following sequence of events will occur.

The type of device consisting of microphone 25 and amplifier 27 will almost invariably include an impedance which varies in time in accordance with the audio signal being amplified. If, for example, a transistor 24 is used in the amplifier 27, its collector voltage will vary at the audio rate, causing, as is well known, a corresponding variation in the collector-base capacity. When some small fraction of the transmitted radio frequency energy impinges on the collector-base junction of the transistor, the variation in capacity will cause a corresponding variation in the RF impedance of the junction and hence in the scattered radio frequency energy. The principal frequency components in the scattered energy will be the sum and difference of $F_T$ and $F_A$.

This re-radiated energy designated by line 20 is picked up by antenna 21 which in turn is coupled to a radio frequency receiver 19. The received frequency ($F_R$) represents $F_T$ plus or minus $F_A$. This difference frequency $F_R$ may be read directly on a meter 22.

In accordance with the above discussion, it can be seen that the present invention involves exposing a specimen area to two diffferent forms of energy (acoustic and electromagnetic) having distinct frequency signatures and seeking an interaction or intermodulation between the two forms of energy.

Figure 2:
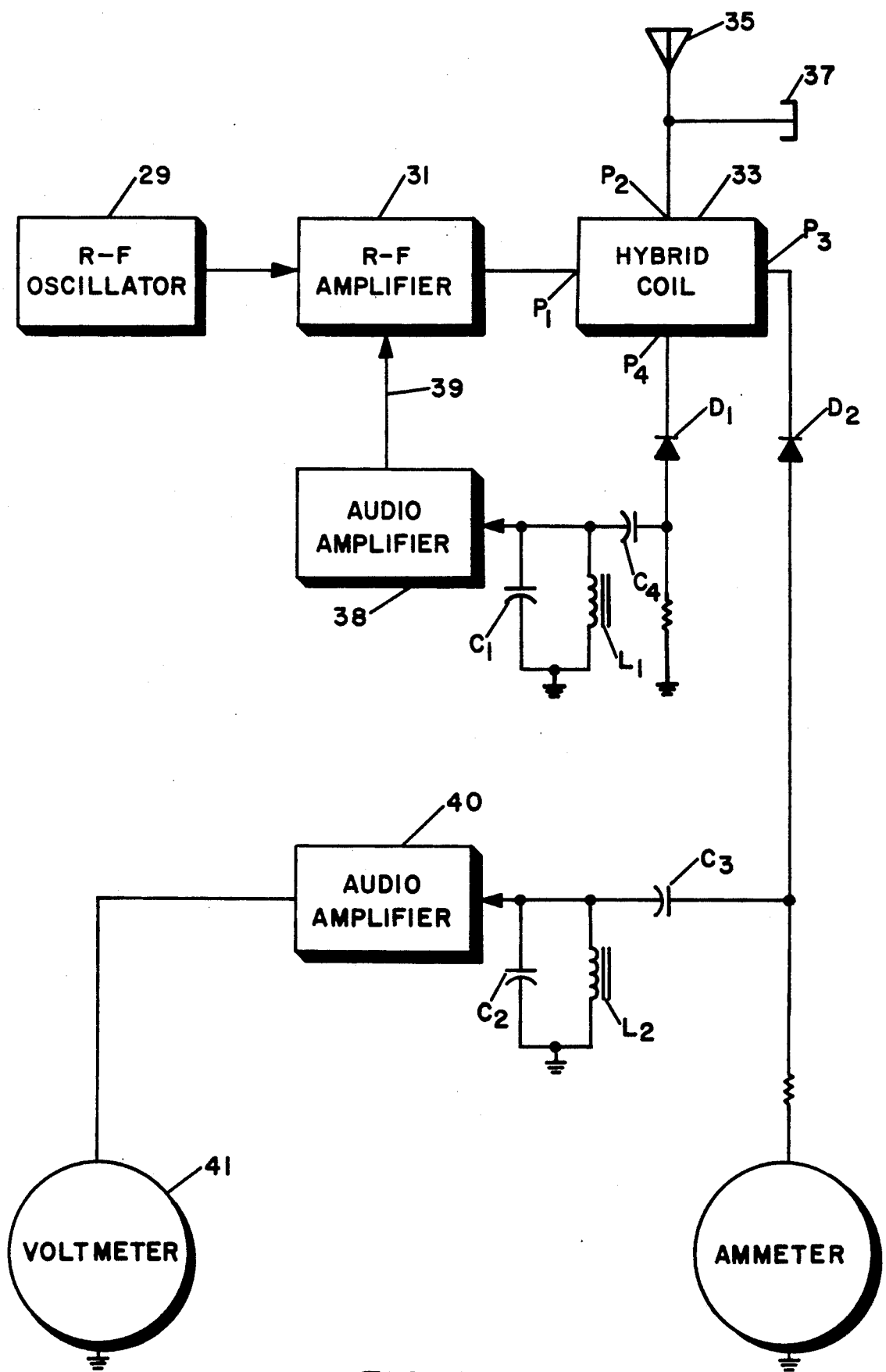
FIG. 2 is a schematic circuit of one implementation of the present invention.

If the interaction or intermodulation is sufficiently strong, the specific design of the transmitter and receiver are not critical. More often, the intermodulation is weak, and special attention must be paid to means of overcoming the masking effect of the inevitable noise sidebands in the transmitted signal. To illustrate a solution to this problem, and to more specifically explain this invention, attention is directed to FIG. 2 and the following description. FIG. 2 is as schematic illustration of a system combining transmitter 11 and receiver 19 of FIG. 1. It is to be understood that the figures specifically used are for purposes of illustration only and are not to be considered in any manner as limitation on the inventive concept.

Assume that the crystal oscillator 29 consists of a 50 mHz oscillator which supplies several milliwatts of drive to a two-watt output 50 mHz amplifier 31 having a nominal gain of 30 db.

The output of transmitter amplifier 31 is coupled to an antenna 35 and to a reference detector diode $D_1$ by means of a hybrid transformer 33 having ports $P_1$ through $P_4$. By suitable design of the hybrid coil 33, an insolation of 20 to 30 db can be maintained between ports $P_1$ and $P_3$. Therefore, signal detector diode $D_2$ which terminates port $P_3$ of the hydrid coil is correspondingly isolated from the noise output of the transmitter.

To further reduce critical components of AM noise, the output of reference detector diode $D_1$, which is a voltage proportional to the envelope of the transmitter output, is passed through a narrow band filter $L_1$-$C_1$ centered at 4 kHz. This output is amplified in audio amplifier 38 and applied as a negative envelope feedback to the transmitter power amplifier 31 by means of lead 39. Since the three db bandwidth of the gain characteristic of the feedback loop can be reduced to approximately 100 cps by filter $L_1$-$C_1$, it is practical to achieve a maximum loop gain in excess of 40 db without encountering loop stability problems. This use of feedback produces an additional reduction in the AM noise content of the transmitter of about 40 db.

The isolation provided by the hybrid coil 33 combined with the noise reduction obtained by the feedback loop leads to a net reduction of approximately 60 db in the near 4 kHz components of AM noise. Considering that amplifier 31 amplifies the noise output of the oscillator 29 by about 30 db, it is seen that a noise-temperature-ratio of up to perhaps 35 db in the output of the oscillator may be accepted without as significant further degredation of effective receiver noise-figure beyond the 10 db value assumed previously.

It is to be noted that in the discussion of FIG. 2 the audio generator has been eliminated from the figure for purposes of clarity, but it is to be understood that the operation of the device includes such audio generator.

From the above discussion it will be seen that the RF power re-radiated by a concealed amplifier, such as amplifier 27 in FIG. 1, is picked up by the antenna 35 and applied to diode $D_2$ along with a small fraction of power from the transmitter. The transmitter component serves as a local oscillator input so that sidebands spaced 4 kHz from the carrier are demodulated and isolated in a 4 kHz filter consisting of the parallel combinatio of capacitor $C_2$ and coil $L_2$. The filter output is amplified in audio amplifier 40 by about 100 db.

The level of the output of amplifier 40 may be indicated on an AC voltmeter 41 having, preferably, a logarithmic response so that a wide range of signal strengths may be accommodated. From the above description, it may be dseen that the present invention contains three basic elements which include an acoustic tone generator, a stable and noise-free RF transmitter and a sensitive narrow band receiver wherein the receiver and transmitter may have separate or common antenna devices. Taken together, the RF transmitter and receiver constitute a primitive form of CW radar and have the same primary limitation to sensitivity-leakage of noise sidebands from the transmitter into the receiver.

Although the present invention is specifically desirable for any microphone-preamplifier type of covert device which is connected by wire to a remote listening post, it is applicable to any covert listening device which contains therein a time varying impedance which may react to the radio frequency and audio generated tone as described above.

The above description and drawings are illustrative only and are not to be considerable as any limitation on the invention as set forth in the following claims.

I claim:

1. A device for detecting a convert microphone-amplifier including a time varying impedance comprising radio frequency transmitting means for illuminating an area to be inspected, audio tone generating means for simultaneously illuminating said area, and radio frequency receiving means for receiving radiated energy from said time varying impedance within said illuminated area.

2. The device of claim 1 wherein said audio tone generating means drives said time varying impedance into a non-linear mode of operation for modulating said transmitted radio frequency.

3. The device of claim 1 wherein said time varying impedance is a solid state element.

4. A device for detecting a covert microphone-amplifier including a time varying impedance comprising means for transmitting a preselected radio frequency ($f_T$) to a specified area, means for transmitting a preselected audio frequency ($F_A$) to said specified area, and means for receiving a radio frequency ($F_R$) from said time varying impedance equal to $(F_T)-(F_A)$.

5. The device of claim 4 wherein said device is a solid state element.

6. A method for detecting a covert microphone-amplifier including a time varying impedance which consists of simultaneously illuminating an area to be inspected with an acoustic tone of a preselected frequency and a radio frequency carrier of a preselected frequency, and testing said area with a radio frequency receiver to detect re-radiated radio frequency energy from said time varying impedance.

7. The method of claim 6 wherein said acoustic tone modulates said radio frequency carrier due to the non-linear mode of operation of said time varying impedance.

8. The method of claim 6 wherein said time varying impedance is a solid state element.

* * * * *